Aug. 6, 1940.  H. N. DURHAM  2,210,572
DUAL WHEELED VEHICLE
Filed May 7, 1938  2 Sheets-Sheet 1

INVENTOR
BY
ATTORNEYS

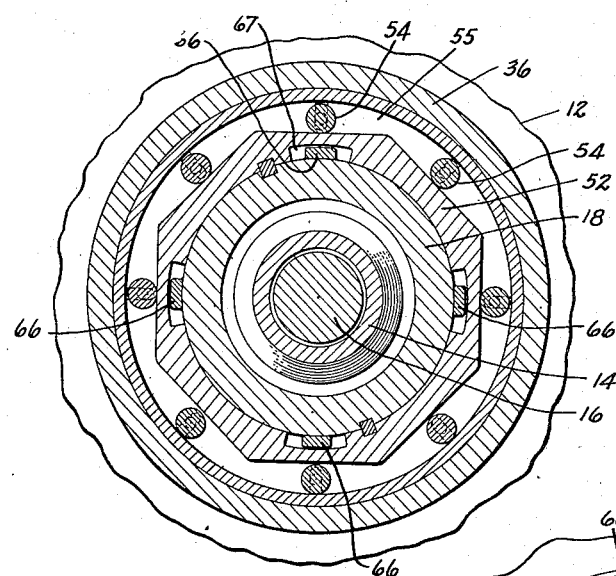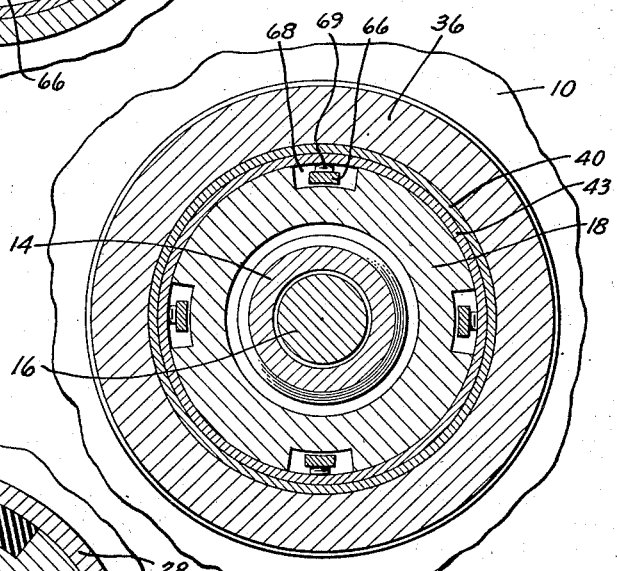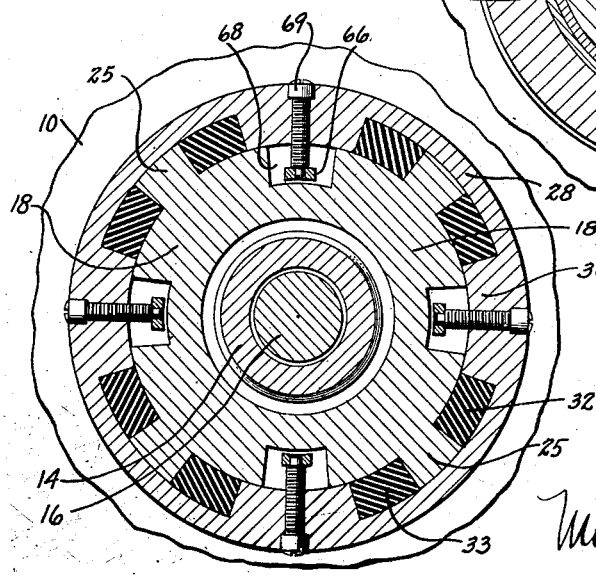

Patented Aug. 6, 1940

2,210,572

UNITED STATES PATENT OFFICE 2,210,572

DUAL WHEELED VEHICLE

Hobart N. Durham, Munsey Park, N. Y., assignor to Differential Wheel Corporation, a corporation of Delaware Application May 7, 1938, Serial No. 206,537

8 Claims. (Cl. 180—22)

The present invention relates to dual wheeled vehicles and more particularly to a novel and improved driven, dual wheeled axle in which independent rotation of the wheels is permitted under certain conditions.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 2 is a vertical section taken on the line 2—2 of Figure 1; and

Figure 1:
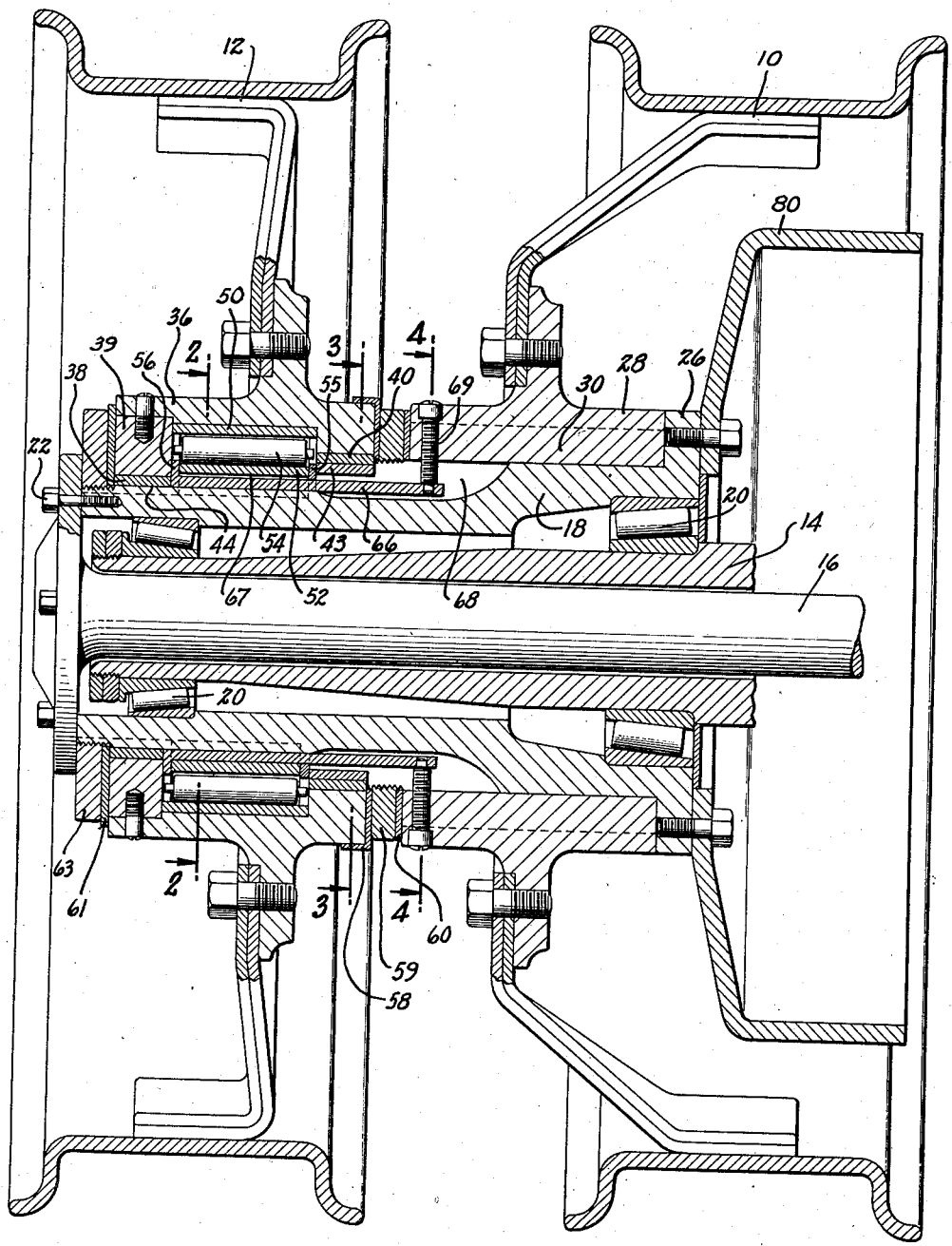
Figure 1 is a vertical section showing an illustrative embodiment of the present invention.

Figures 3 and 4 are vertical sections taken on the lines 3—3 and 4—4 of Figure 1, respectively.

The present invention has for its object the provision of a novel and improved dual wheeled axle for motor vehicles in which independent rotation of the dual wheels is permitted only under certain conditions. A further object is the provision of a dual wheeled assembly in which one wheel is connected to the axle through a clutch which is controlled by the torque being transmitted through the other wheel. The invention also provides a dual wheeled axle in which the wheels are permitted to rotate independently except when one of the wheels is being driven or braked so that some slippage might occur between the tire and road.

Heretofore, dual driven wheels have been provided in which the distribution of torque between the wheels was effected by means of a differential, but such constructions are unsatisfactory as they do not provide a positive drive for either wheel, nor do they prevent slippage or skidding of one wheel or the other, for with a differential the rotation of the wheels cannot be controlled as one wheel may move in an opposite direction to the other wheel. Also, it has been proposed to provide a clutch between two independently rotatable, but undriven, wheels so as to couple them together during the application of the brake to the inner wheel. Up to the present time, however, no commercially satisfactory means has been proposed for coupling the dual wheels together for driving and braking.

In accordance with the illustrative embodiment of the invention a pair of dual wheels are rotatably mounted at the end of an axle shaft and one of the wheels is directly driven by means of the axle through a resilient coupling. The other wheel is held coaxial with the driven wheel but is normally free to rotate with respect thereto so that it may roll without slippage around corners and on the straight-away. A clutch is provided between the two wheels so as to lock them together and cause them to rotate in unison and this clutch is controlled by the torque exerted between the first wheel and the road, preferably during both braking and driving when the torque is sufficient to cause any appreciable tendency of the first wheel to slide or slip on the road. The braking means is preferably so positioned that its effort is applied similarly to the driving torque, that is, through the resilient member.

It will be understood that the foregoing general description, and the following detailed description as well, are exemplary and explanatory of the invention, but are not restrictive thereof.

Referring now in detail to the illustrative embodiment of the invention as shown in the accompanying drawings, there is provided a pair of dual wheels, an inner wheel 10 and an outer wheel 12 at each end of the conventional axle housing 14 and axle 16, there being thus provided four wheels in axial alinement, two at each side of the vehicle. A differential, as is usual, is provided for driving the two half axles 16 from a common propeller shaft (not shown). The invention is shown as applied to a full-floating axle in which the entire wheel load is carried on the axle housing 14 rather than on the axle 16.

Wheels 10 and 12 are rotatably mounted by means of an elongated sleeve 18 surrounding the end of the axle housing 14 and rotatable thereon by means of the roller bearings 20. The end of axle 16 is flanged and bolted to the outer end of sleeve 18 by means of cap screws 22 and the driving torque is transmitted to the sleeve by means of the axle 16, flange, and screws 22.

The inner end of sleeve 18 is provided with splines 25 and at its innermost end is a flange 26, and is surrounded by the hub 28 for wheel 10. Hub 28 is similarly splined, as at 30, and these splines 25 and 30 provide a considerable space between them in which is positioned a resilient element, such as arcuate blocks 32 and 33 of synthetic rubber so as to permit slight relative movement between the wheel 10 and the sleeve 18 due to the resiliency of the rubber blocks 32.

The outer wheel 12 is mounted on sleeve 18, in axial alinement with wheel 10, by means of its hub 36 which is provided with a bushing 38, an annular member 39 and another bushing 40, bushings 40 and 38 bearing against the bushing 43 mounted on the sleeve 18 and the bearing surface 44 respectively.

Means are provided for coupling the wheel 12 to wheel 10 at certain times and for this purpose a clutch is provided between this wheel 12 and the sleeve 18. This clutch, as embodied, is a double-acting roller clutch comprising the outer cylindrical race 50 fast to hub 36, the inner octagonal member 52 keyed to sleeve 18, the rollers 54 positioned between the member 52 and the race 50 and retained in uniform spaced relation by means of the annular cages 55 and 56 at the ends of the rollers 54 and apertured to receive and retain the reduced roller ends.

Axial movement of the wheels 10 and 12 is prevented, and their relative rotation is facilitated by means of the thrust members 58, 59 and 60 positioned between the wheels at their hubs and the thrust washer 61 positioned between the outer end of hub 36 and the retaining nut 63 threaded on the extreme end of sleeve 18.

The clutch between the wheels is controlled in its operation by means of the wheel 10 and as the wheel 10 is driven or braked with sufficient torque, the clutch is operated to prevent relative rotation between the wheels in one direction or the other, depending upon whether the wheels are being driven or braked. As embodied, the cages 55 and 56 are connected to axially extending bars 66 which pass through cut away slots 67 in the member 52 and also through similarly spaced slots 68 in the sleeve 18 and at their inner ends are connected to the hub 28 of the inner wheel 10 by means of the radial screws 69.

The braking effort for the wheels is preferably applied to the sleeve 18, as is the driving torque, rather than to either wheel directly. For this purpose, the brake drum 80 is bolted to the inner end of sleeve 18 and cooperates with a conventional set of brake shoes in the usual manner.

In the operation of the disclosed embodiment, while coasting or moving with only a light driving or braking effort, wheel 10, sleeve 18 and shaft 16, rotate in exact unison, while wheel 12 is free to move at any rate. Thus free relative movement is permitted between the wheels 10 and 12 to compensate for any road irregularities, turning of corners, or the normal difference in rotation which independently rotatable wheels have in rolling over the road.

When the driver increases the power, as by shifting to a lower gear or by opening the throttle, there is an increasing tendency of the inner wheel to slip on the road and this normally causes excessive wear of the inner tire. However, with the present embodiment, the increase in driving torque causes the resilient members 32 between the advancing side of the driving spline 25 and the trailing side of the driven spline 30 to be compressed, permitting relative movement of the wheel 10 and the sleeve 18. This relative movement causes the bars 66 to be moved oppositely to the driving force, and if the torque is sufficient, causes the cages 55 and 56 to move the rollers 54 into clutching position between the member 52 and the race 50 so that wheel 12 cannot move rearwardly with respect to sleeve 18. The same operation occurs during starting of the vehicle.

As soon as the torque is reduced, the rubber 32 expands, causing clutch rollers 54 to be moved to released position.

At all times during the forward travel of the vehicle, except when braking hard, wheel 12 is free to move ahead of wheel 10 and thus it may roll free when it is the outermost wheel on a curve.

During braking, sleeve 18 is braked by brake drum 80, and resilient members 33 are compressed causing rollers 54 to move in the opposite direction, or ahead of their rotation, thereby locking the wheels 10 and 12 and causing the braking effort to be applied through both wheels.

In reverse, the operation is the same as with forward braking and both wheels may be positively driven if sufficient torque is applied.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheeled assembly, the combination of a pair of independently rotatable wheels rotatably mounted side by side, a rotatable member on which the wheels are supported, means permitting slight relative movement between the rotatable member and one wheel, means permitting free relative movement between the member and other wheel, and means for preventing the free relative rotation.

2. In a dual wheeled assembly, the combination of a pair of independently rotatable wheels rotatably mounted side by side, a rotatable member on which the wheels are supported, a brake acting on said member and means controlled by the brake for preventing relative movement between the wheels.

3. In a dual wheeled assembly, the combination of a pair of independently rotatable wheels rotatably mounted side by side, one of the wheels being freely rotatable, means for clutching the wheels together, means for driving the wheels, a brake and means controlled by the brake for operating the clutching means.

4. In a dual wheeled assembly, the combination of a pair of independently rotatable wheels rotatably mounted side by side, a driving member for said wheels, rubber members positioned between the driving member and one wheel, means for compressing said members by relative rotation of said wheel and driving member, a clutch for connecting one of the wheels to the driving member, and means for operating the clutch by compression of the rubber members.

5. In a dual wheeled assembly, the combination of a pair of independently rotatable wheels rotatable side by side at one end of an axle, a sleeve on which one of the wheels has limited movement and on which the other wheel has normal free movement, a double acting roller clutch between the free wheel and the sleeve, resilient means restraining the limited movement of the other wheel with reference to the sleeve, and means actuated by the limited movement of the other wheel for controlling the clutch.

6. In a dual wheeled assembly, the combination of a pair of independently rotatable wheels rotatable side by side at one end of an axle, a sleeve on which one of the wheels has limited movement and on which the other wheel has normal free movement, a double acting roller clutch between the free wheel and the sleeve, and means for controlling the clutch by the driving or braking of the sleeve.

7. In a dual wheeled assembly, the combination of a pair of independently rotatable wheels rotatable side by side at one end of an axle, a sleeve on which one of the wheels has limited movement and on which the other wheel has normal free movement, a double acting roller clutch between the free wheel and the sleeve, means for driving and means for braking the sleeve, and means for engaging the clutch when the sleeve is driven or braked.

8. In a dual wheeled assembly, the combination of a pair of independently rotatable wheels rotatable side by side at one end of an axle, and means for driving both wheels from the axle including an overrunning clutch for driving one wheel from the axle whereby one wheel may travel faster than the axle at any time.

HOBART N. DURHAM.